United States Patent
Lai et al.

(10) Patent No.: US 8,188,782 B1
(45) Date of Patent: May 29, 2012

(54) CLOCK SYSTEM AND METHOD FOR COMPENSATING TIMING INFORMATION OF CLOCK SYSTEM

(75) Inventors: Wen-Cheng Lai, Taichung (TW); Kun-Tso Chen, Chang-Hua Hsien (TW); Chun-Nan Chen, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 52 days.

(21) Appl. No.: 12/965,917

(22) Filed: Dec. 12, 2010

(51) Int. Cl.
*H03K 3/00* (2006.01)

(52) U.S. Cl. .......................... 327/295; 327/298

(58) Field of Classification Search .................. 327/291, 327/292, 295, 298–299, 141–143; 331/49, 331/59, 116 FE
See application file for complete search history.

(56) References Cited

U.S. PATENT DOCUMENTS

| | | | |
|---|---|---|---|
| 6,972,608 B2 * | 12/2005 | Misawa et al. | 327/291 |
| 7,196,589 B1 * | 3/2007 | Silva et al. | 331/49 |
| 2009/0086662 A1 * | 4/2009 | Okada | 370/311 |
| 2009/0322606 A1 | 12/2009 | Gronemeyer | |

* cited by examiner

*Primary Examiner* — An Luu
(74) *Attorney, Agent, or Firm* — Winston Hsu; Scott Margo

(57) ABSTRACT

A clock system includes a clock signal generating circuit and a controlling circuit. The clock signal generating circuit is used for generating a primary clock signal and a reference clock signal both derived from an oscillating signal of the clock signal generating circuit. The controlling circuit is coupled to the clock signal generating circuit and used for receiving the primary clock signal under a normal mode and compensating timing information generated from the primary clock signal according to the reference clock signal when the clock system exits a power saving mode. The primary clock signal is de-activated when the clock system enters the power saving mode and is activated when the clock system exits the power saving mode. The clock system can keep a continue clock for system to use when the primary clock signal is gated or power saving mode is entered.

22 Claims, 5 Drawing Sheets

… (1)

CLOCK SYSTEM AND METHOD FOR COMPENSATING TIMING INFORMATION OF CLOCK SYSTEM

BACKGROUND

The invention relates to a scheme for timing information compensation of a clock signal, and more particularly to a clock system and a method for timing information compensation applied to a clock signal used in a mobile device such as a global navigation satellite system (GNSS) receiver.

Subsystems within a mobile product usually operate at different frequency bands, but, in order to save chip cost and area, several subsystems need to share one oscillator in the mobile product. Therefore, synthesizers are required to generate the particular frequencies for the subsystems according to the clock frequency from the oscillator. In general, the oscillator is temperature-compensated so that the clock frequency provided by the oscillator is precise. The power consumption of the temperature-compensated crystal oscillator is, however, greater than that of a conventional crystal oscillator.

For achieving power saving, a mobile product may change a clock frequency from a higher speed clock of a temperature compensated crystal oscillator to a lower speed clock of a conventional crystal oscillator during a specific time period. Since the conventional crystal oscillator has less resistance to the temperature change, the clock frequency of the conventional crystal oscillator is easily affected by temperature variation. Thus, the frequency/timing information carried by the clock signal of the mobile product during this specific time period is less precise. This causes performance decrease of the mobile product.

SUMMARY

It is therefore one of the objectives of the invention to provide a clock system and related method for achieving precise timing information compensation for a power saving time period, to solve the above-mentioned problems. In addition to generating the benefit of the precise timing information, the provided clock system and method can save a greater percentage of battery power due to saving time for signal re-acquisition as compared to the conventional clock systems.

According to an embodiment of the claimed invention, a clock system is disclosed. The clock system comprises a clock signal generating circuit and a controlling circuit. The clock signal generating circuit is utilized for generating a primary clock signal and a reference clock signal both derived from an oscillating signal of the clock signal generating circuit. The controlling circuit is coupled to the clock signal generating circuit and utilized for compensating timing information generated from the primary clock signal according to the reference clock signal when the clock system exits the power saving mode. The primary clock signal is de-activated when the clock system enters or stays in the power saving mode and is activated when the clock system exits the power saving mode.

According to another embodiment of the claimed invention, a method for timing information compensation of a clock signal used in a clock system is disclosed. The method comprises: generating a primary clock signal and a reference clock signal both derived from an oscillating signal; and compensating timing information of the primary clock signal according to the reference clock signal when the clock system exits a power saving mode. The primary clock signal is de-activated when the clock system enters or stays in the power saving mode and is activated when the clock system exits the power saving mode.

According to another embodiment of the present invention, a clock system is provided. The clock system includes a clock signal generating circuit for generating a primary clock signal and a reference clock signal, a first timer corresponding to the reference clock signal, a second timer corresponding to the primary clock signal, and a compensating unit. The compensating unit is coupled to the first timer and the second timer, utilized for aligning a time boundary of the first timer with a time boundary of the second timer when entering a power saving mode, and used for aligning a time boundary of the second timer with a time boundary of the aligned first timer when exiting the power saving mode. In addition, the compensating unit is arranged to receive the primary clock signal under a normal mode, and used for compensating timing information generated from the primary clock signal according to the reference clock signal when the clock system exits the power saving mode. The primary clock signal is de-activated when the clock system enters the power saving mode and is activated when the clock system exits the power saving mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
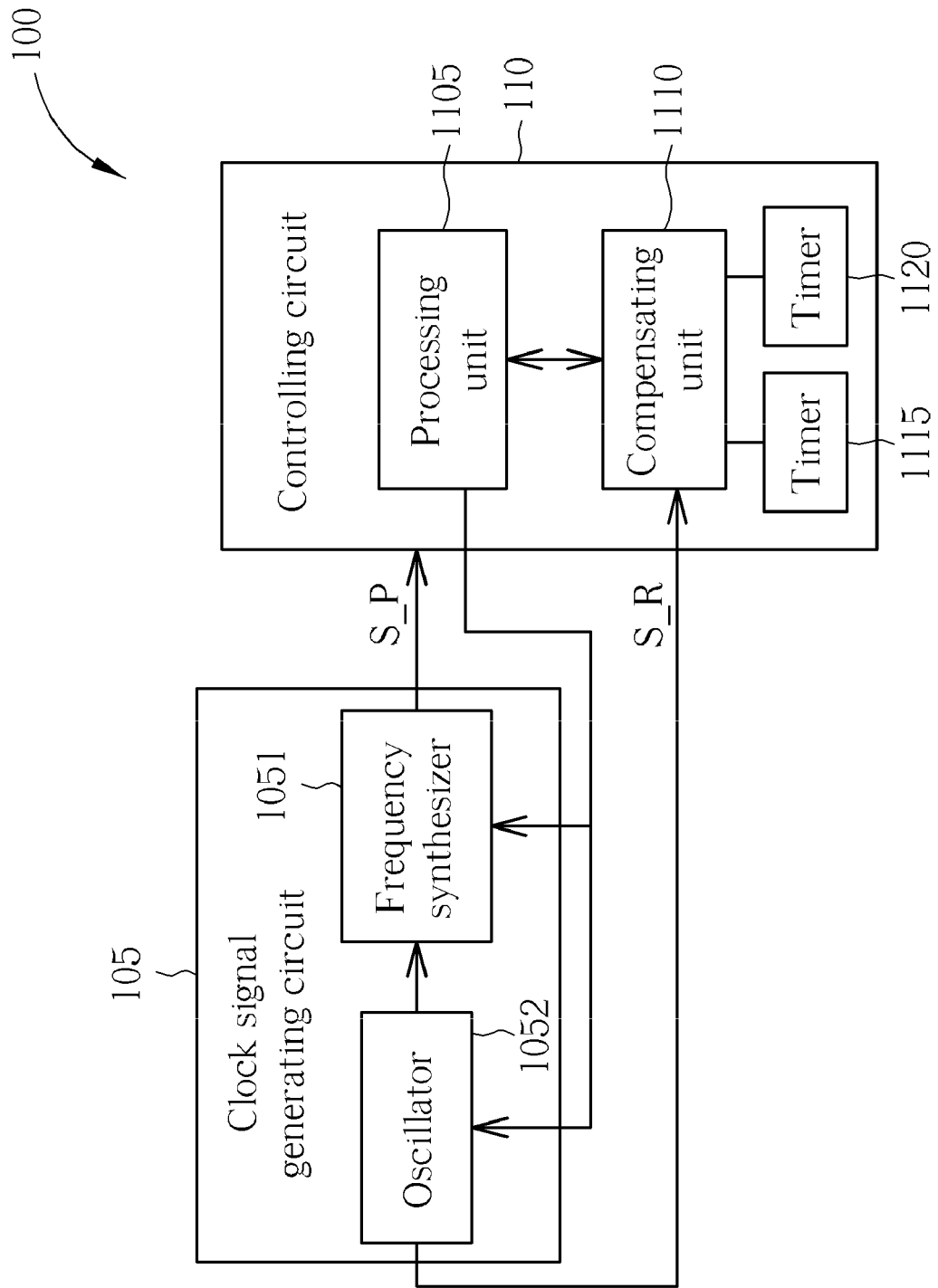
FIG. 1 is a block diagram of a clock system for timing information compensation of a clock signal according to a preferred embodiment of the present invention.

Please refer to FIG. 1. FIG. 1 is a block diagram of a clock system 100 according to a preferred embodiment of the present invention. The clock system 100 can be configured within a portable communication device such as a global navigation satellite system (GNSS) receiver and a mobile phone including a GNSS receiving function, to provide clock signals to the subsystems in the portable communication device. In this embodiment, the clock system 100 includes a clock signal generating circuit 105 and a controlling circuit 110. The clock generating circuit 105 is suitable for generating clock signals required by the subsystems of the portable communication device and includes an oscillator 1052 and a frequency synthesizer 1051. The oscillator 1052 may include a temperature compensated crystal oscillator (TCXO), conventional crystal oscillator, or computer programmable temperature compensated crystal oscillator, etc. Please note that for illustration simplicity, only one oscillator and one frequency synthesizer are shown in FIG. 1. However, this should not be a limitation to the invention. The clock system 100 at least includes two operation modes: a normal mode and a power saving mode wherein the power saving mode may be also called a stand-by mode or a sleep mode. Under the normal mode, both the oscillator 1052 and the frequency synthesizer 1051 are powered on, and the clock system 100 provides a clock signal from which precise and continuous timing information can be derived to the portable communication device. In one example where the portable communication device has GNSS receiving function, the satellite signals can be acquired/obtained by referring to the precise timing information immediately. Under the power saving mode, power provided to at least one circuitry element included within the portable communication device is decreased or turned off (i.e. disabled), so as to achieve the purpose of power saving. That is, the power provided to a particular circuit of the clock system 100 may be decreased or turned off. In this embodiment, power provided to the frequency synthesizer 1051 in the clock system 100 is decreased or turned off since the frequency synthesizer 1051 consumes more power. The oscillator 1052 still functions to generate clock signals to the controlling circuit 110 under the power saving mode, so that timing information can be continuously provided. The controlling circuit 110 includes a processing unit 1105 and a compensating unit 1110, and is suitable for compensating timing information when exiting the power saving mode.

At least one of the objectives of the clock system 100 is to perform timing information compensation of a clock signal for immediately obtaining the precise timing information when the clock system 100 exits the power saving mode and then enters the normal mode (i.e. the power saving mode becomes de-activated and the normal mode becomes activated). The clock signal generating circuit 105 is utilized for generating a primary clock signal S_P and a reference clock signal S_R, and both of the primary clock signal S_P and the reference clock signal S_R are derived from an oscillating signal of the clock signal generating circuit 105. The controlling circuit 110 is coupled to the clock signal generating circuit 105 and used to receive the primary clock signal S_P under the normal mode and to receive the reference clock signal S_R under the power saving mode. The controlling circuit 110 compensates timing information derived/generated from the primary clock signal S_P according to the reference clock signal S_R when the clock system 100 exits the power saving mode. The primary clock signal S_P is de-activated during the power saving mode, so the timing information of the primary clock signal S_P should be calibrated or compensated when the clock system 100 exits the power saving mode. In this embodiment, de-activating the primary clock signal S_P indicates that the primary clock signal S_P is turned off or its power/signal strength level is decreased to be a lower level such as an extremely low level that approximates zero. Activating the primary clock signal S_P indicates that the primary clock signal S_P is turned on or its power/signal strength level is increased to be a higher level. More specifically, the oscillator 1052 in the clock signal generating circuit 105 is utilized for generating the oscillating signal acting as the reference clock signal S_R inputted to the controlling circuit 110, and the frequency synthesizer 1051 is coupled to the oscillator 1052 and used to receive the oscillating signal and generate the primary clock signal S_P when the clock system 100 is under the normal mode. In addition, the processing unit 1105 in the controlling circuit 110 is used to control the settings of the oscillator 1052 and the frequency synthesizer 1051 and the power provided to the oscillator 1052 and the frequency synthesizer 1051. In other words, the processing unit 1105 can enable/disable the oscillator 1052 and the frequency synthesizer 1051. However, a person with ordinary skill in the art should appreciate that the power can also be controlled or provided by an external controller. In addition, the processing unit 1105 can send commands to trigger the compensating unit 1110 to initiate the timing information compensation.

In this embodiment, for saving power, the power provided to the frequency synthesizer 1051 is decreased or turned off when the clock system 100 stays in the power saving mode. That is, the primary clock signal S_P generated by the frequency synthesizer 1051 is de-activated (e.g. turned off or decreased to a smaller level in amplitude or frequency) when the clock system 100 enters the power saving mode, and is activated (e.g. turned on or increased) again when the clock system 100 exits the power saving mode. The oscillator 1052 is kept in a turned-on state or a powered-on state no matter whether the clock system 100 stays in the normal mode or in the power saving mode. Thus, the controlling circuit 110 under the power saving mode can still receive the reference clock signal S_R generated from the oscillator 1052. When the clock system 100 exits the power saving mode and then enters the normal mode, the controlling circuit 110 can use the timing information derived from the received reference clock signal S_R to immediately update the timing information generated from the primary clock signal S_P so as to provide precise and continuous timing information to the portable communication device. The oscillator 1052 is implemented by a temperature compensated oscillator such as a temperature compensated crystal oscillator (TCXO) and can generate a precise oscillating signal that is not easily affected by temperature variation. Thus, the oscillation of the received reference clock signal S_R is not easily affected by temperature variation. Since the timing information generated from the primary clock signal S_P is compensated, the portable communication device including the GNSS receiving function can synchronize with one satellite immediately to retrieve satellite information (i.e. satellite information re-acquisition) more rapidly. Since the portable communication device can synchronize with one satellite more rapidly, retrieving satellite information can be completed earlier and the power consumption can thereby be improved with increased resolution for GNSS code chip and Doppler effects.

Figure 2A:
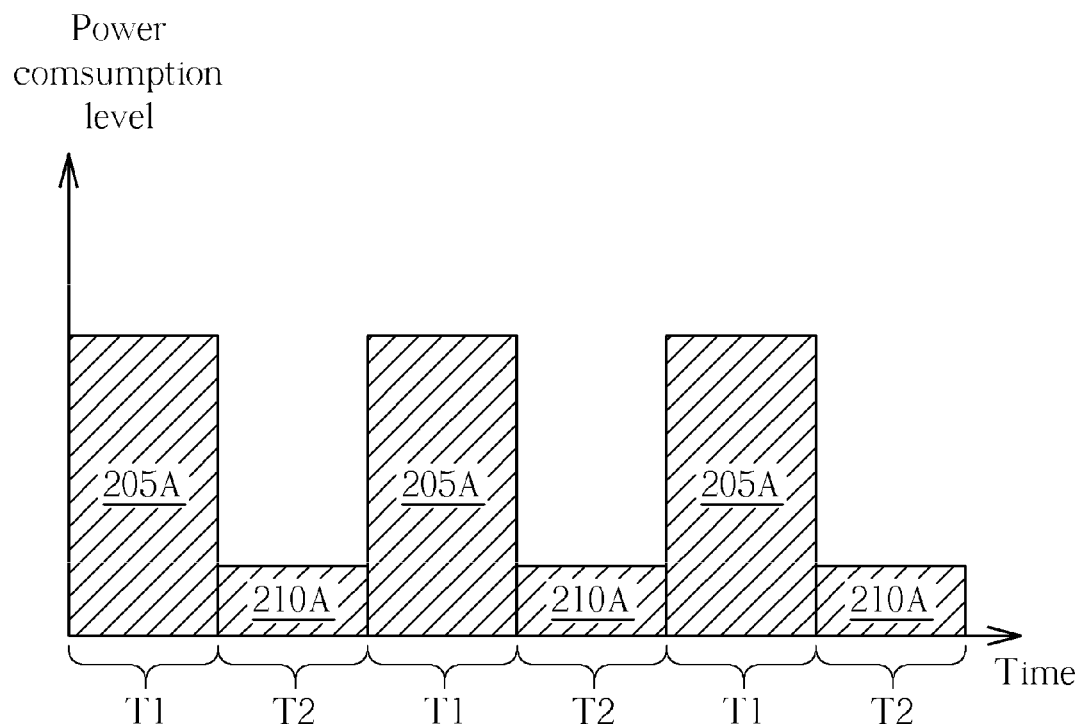
FIGS. 2A-2B are diagrams respectively illustrating power saving performances of a conventional power saving scheme and the method corresponding to the clock system as shown in FIG. 1.
Figure 2B:
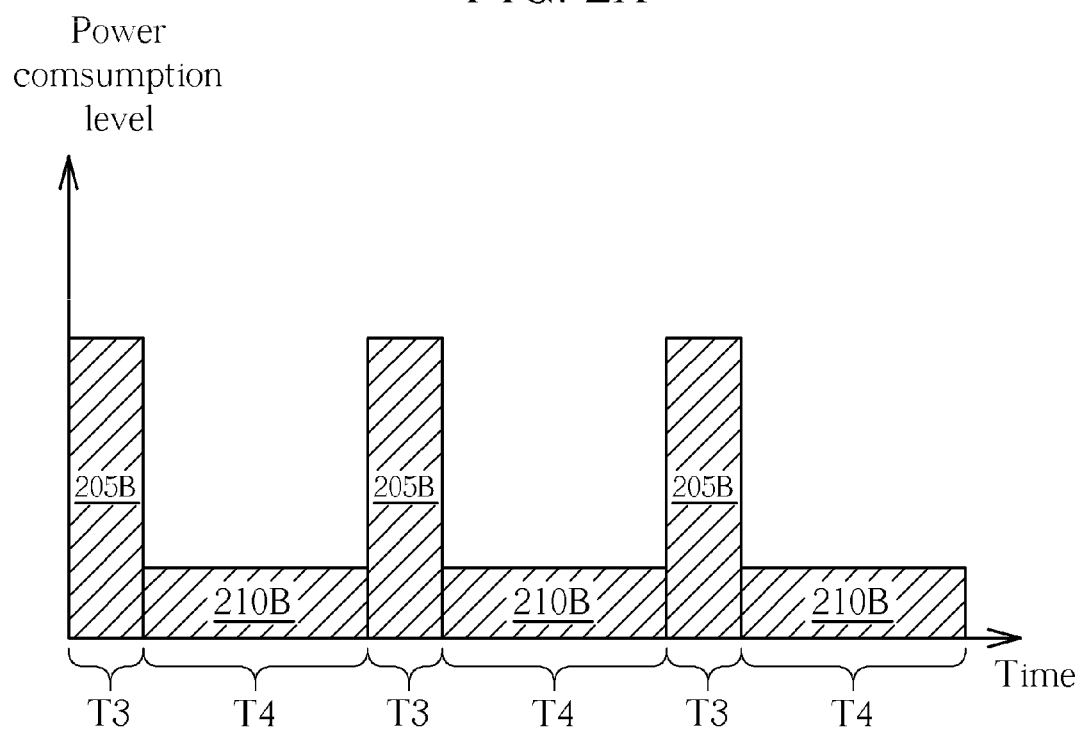

Please refer to FIGS. 2A-2B. FIGS. 2A-2B are diagrams respectively illustrating power performances of a conventional power saving scheme and the above-mentioned compensation scheme. In FIG. 2A, a conventional GNSS receiver in total consumes more power since the conventional GNSS receiver wastes more time on retrieving satellite information. For example, the conventional GNSS receiver spends a longer time period T1 each time it retrieves satellite information. Thus, the conventional GNSS receiver consumes more power wherein the area 205A is indicative of the power consumed during the time period T1. After the satellite information is obtained, the conventional GNSS receiver enters a power saving mode (time period T2), wherein the area 210A is indicative of the power consumed by the conventional GNSS receiver during the time period T2. Then, the conventional GNSS receiver needs to retrieve satellite information again and consumes large power (the area 205A).

As shown in FIG. 2B, the GNSS receiver implementing the clock system 100 of this embodiment spends a shorter time period T3 each time it retrieves satellite information. Accordingly, the GNSS receiver consumes less power wherein the area 205B is indicative of the power consumed by the GNSS receiver during the time period T3 each time under the normal mode. Because the GNSS receiver can retrieve satellite information more rapidly, the GNSS receiver can enter the power saving mode earlier and stays in the power saving mode longer. Therefore, more power can be saved on average. The area 210S is indicative of the power consumed by the GNSS receiver during the time period T4 under the power saving mode. In total, the GNSS receiver using the clock system 100 saves more power than that saved by the conventional GNSS receiver.

In detail, to achieve timing information compensation of the primary clock signal S_P, the controlling circuit 110 of this embodiment first synchronizes timing information derived from the reference clock signal S_R with that of the primary clock signal S_P before the clock system 100 enters the power saving mode, and then uses the timing information derived from the reference clock signal S_R to update the timing information derived from the primary clock signal S_P when the clock system 100 exits the power saving mode. In practice, the controlling circuit 110 further comprises a first timer (or counter) 1115 and a first register corresponding to the reference clock signal S_R, and comprises a second timer (or counter) 1120 and a second register corresponding to the primary clock signal S_P; the first and second registers are not shown in FIG. 1 for brevity. The first timer 1115 counts the pulses of the reference clock signal S_R, and the value stored in the first register is increased accordingly. Similarly, the second timer 1120 counts the pulses of the primary clock signal S_P, and the value stored in the second register is increased accordingly. The first and second timer 1115, 1120 may be enabled all the time no matter whether the clock system 100 is in the normal mode or power saving mode; or, the second timer 1120 may be disabled during the power saving mode.

In one embodiment, the second timer 1120 counts the primary clock signal S_P and precise timing information can be derived from the second register during the normal mode. Before the clock system 100 enters the power saving mode, the controlling circuit 110 synchronizes a time boundary of the first timer 1115 with that of the second timer 1120 and modifies the value stored in the first register, so as to synchronize the timing information of the reference clock signal S_R with that of the primary clock signal S_P. The time boundary is the timing edge of the timer, e.g., the time boundary is the rising edge of a pulse per millisecond. The synchronization between the first and second timers 1115, 1120 is suitable for aligning the respective time boundaries of the first and second timers 1115, 1120 before the clock system 100 enters the power saving mode. In practice, since a synchronization delay time may be considered for compensating the timing information generated from the primary clock signal S_P, the value of the first register initially may not set as zero when the value of the first register is modified. For example, the value of the first register may be set as four after modification if the synchronization delay time consumes three clock cycles. In order to make the synchronized first timer more precise, the value of the first register is set as four; however, this is not meant to be a limitation of the present invention. The value of the first register may be set as other values after modification. In addition, the synchronization delay time may be compensated by other mechanisms.

When the clock system 100 enters the power saving mode, the primary clock signal S_P is de-activated and the second timer 1120 is suspended temporarily. Thus, the value of the second register is paused during the power saving mode and is temporarily kept at four. Meanwhile, the first timer 1115 activates and the value of the first register keeps updated based on the reference clock signal S_R. When the clock system 100 exits the power saving mode and then enters the normal mode, the compensating unit 1110 updates the timing of the second timer 1120 by using the timing of the first timer 1115. The update between the first and second timers 1115, 1120 is suitable for aligning the time boundaries of the first and second timers 1115, 1120 to adjust the current time boundary of the second timer 1120. In this embodiment, an update delay time introduced by software or hardware circuits may be considered for compensating the timing information generated from the primary clock signal S_P. Therefore, when the clock system 100 exits the power saving mode so that the frequency synthesizer 1051 is powered on and the primary clock signal S_P is activated again, the value of the second register is increased by one each time the oscillation of the primary clock signal S_P occurs. The compensating unit 1110 is arranged to update the timing information of the primary clock signal S_P by referring to the value stored in the first register. Then, the second timer 1120 is updated, so the value of the second register is updated to a new value according to the value of the first register and the ratio of the frequency of the reference clock signal S_R and the frequency of the primary clock signal S_P. Please be noted that, if the time period of the power saving mode is predetermined, an update command can be sent in advance and the update delay can be handled before the clock system 100 enters the normal mode. The second register can then have gradually increase value after entering the normal mode.

By synchronizing the time boundary of the first timer 1115 to that of the second timer 1120 and then using the first timer's synchronized timing information to update the second timer 1120 that is paused during the power saving mode, the timing information derived from the primary clock signal S_P generated by the frequency synthesizer 1051 becomes precise immediately after the clock system 100 exits the power saving mode. Accordingly, the mobile communication device implementing the clock system 100 can promptly use the precise primary clock signal S_P to retrieve satellite information. Therefore, the mobile communication device consumes less power on average (as illustrated in FIG. 2B).

In addition, in a second embodiment, the controlling circuit 110 can also compensate the timing information of the primary clock signal S_P by referring to a ratio between the frequency of the primary clock signal S_P and the frequency of the reference clock signal S_R. In the second embodiment, the controlling circuit 110 includes a first counter and a second counter. The first counter and the second counter respectively count the number of oscillations/pulses of the reference clock signal S_R per second and the number of oscillations/pulses of the primary clock signal S_P per second. The second counter corresponding to the primary clock signal S_P is suspended temporarily during the power saving mode, and the first counter still continues counting during the power saving mode. Thus, according to the ratio mentioned above and the total number of oscillations/pulses of the reference clock signal S_R, the compensating unit 1110 of the controlling circuit 110 can derive a target counting value of the second counter if the second counter is not suspended after the clock system 100 exits the power saving mode. The compensating unit 1110 can use the derived counting value to update the practical value of the second counter. By doing this, the compensating unit 1110 is also able to achieve the timing information compensation of the primary clock signal S_P. Any time delay introduced by hardware circuits can be considered to appropriately modify the derived counting value. This also obeys the spirit of the present invention.

It should be noted that the clock system 100 is suitable for a shorter power saving time. For example, the clock system 100 is configured in a mobile phone. The clock system 100 can be designed to enter the power saving mode when a user dials a phone number to communicate with another user, and the clock system 100 exits the power saving mode when a telecommunication has been terminated. This example is merely used for illustrative purposes and should not be regarded as a limitation of the present invention. Moreover, the clock system 100 is not only applied to the GNSS receiving function but also can be applied to a Bluetooth communication and a digital TV receiving function, and so on. In practice, the clock system 100 can be applied to any mobile product that needs to save more power.

Figure 3A:
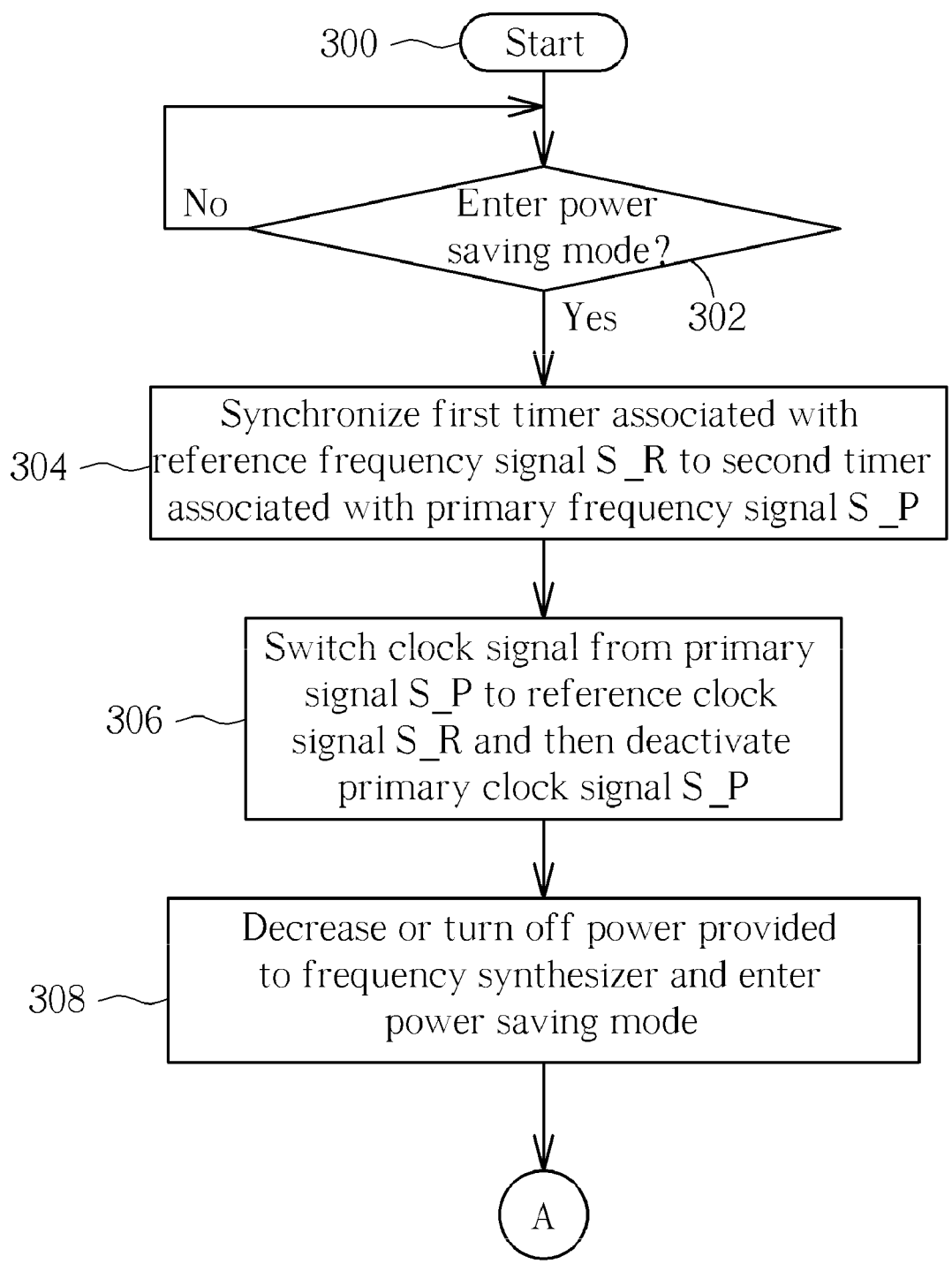
FIGS. 3A-3B are diagrams showing a flowchart of the operation of the clock system as shown in FIG. 1.
Figure 3B:
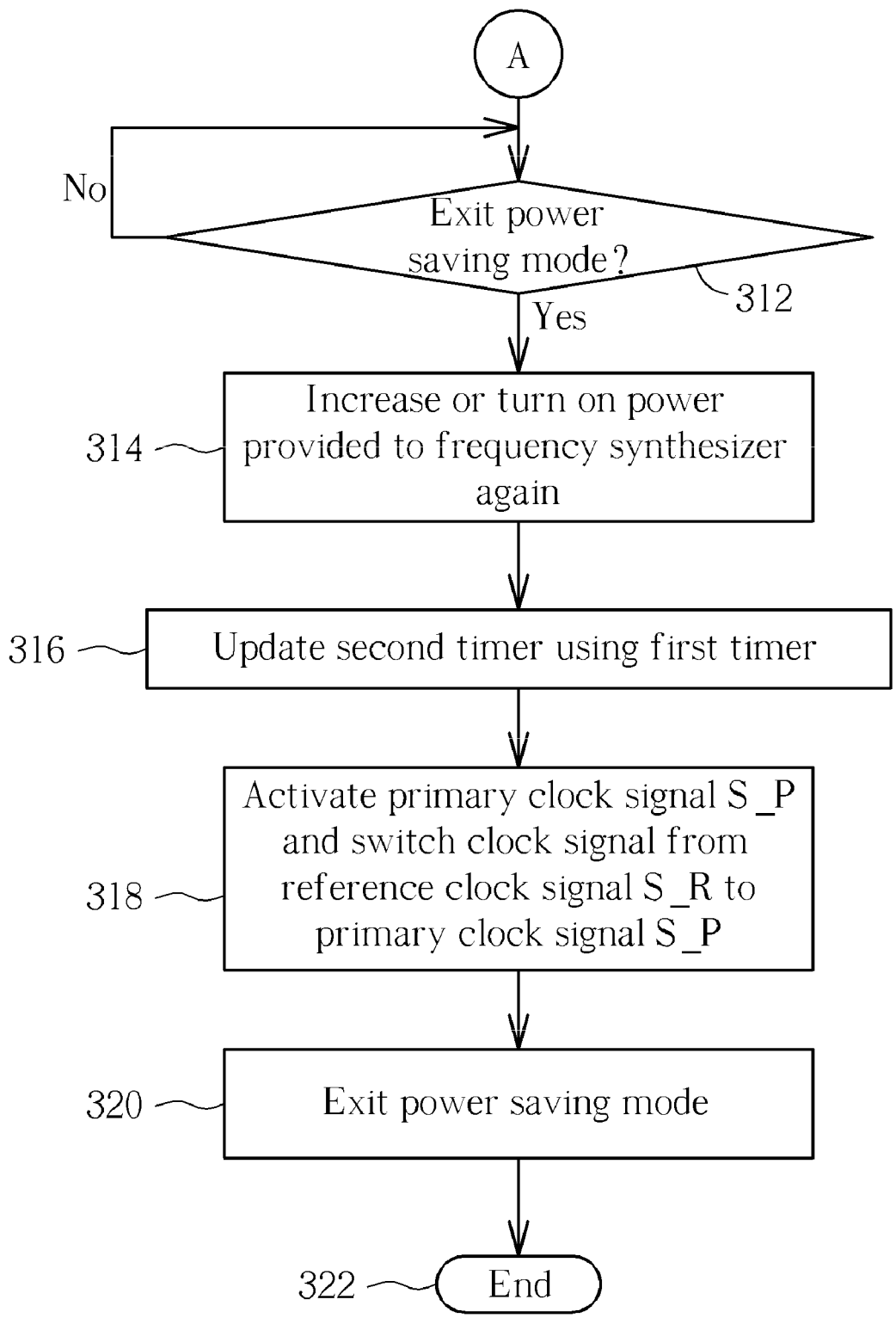

Please refer to FIGS. 3A-3B, which illustrate a flowchart of the operation of the clock system 100 as shown in FIG. 1. Provided that substantially the same result is achieved, the steps of the flowchart shown in FIGS. 3A-3B need not be in the exact order shown and need not be contiguous; that is, other steps can be intermediate. Detailed description of the steps is as follows:

Step 300: Start.

Step 302: Does the clock system 100 decide to enter the power saving mode? If the clock system 100 decides to enter the power saving mode, the flow goes to Step 304; if not, the flow stays in Step 302.

Step 304: The compensating unit 1110 synchronizes the first timer associated with the reference clock signal S_R to the second timer associated with the primary clock signal S_P.

Step 306: The primary clock signal S_P is de-activated. The clock signal for the controlling circuit 110 is switched from the primary clock signal S_P to the reference clock signal S_R.

Step 308: The power provided to the frequency synthesizer 1052 is decreased or turned off, and the clock system 100 enters the power saving mode.

Step 312: Does the clock system 100 decide to exit the power saving mode? If the clock system 100 decides to exit the power saving mode, the flow goes to Step 314; if not, the flow stays in Step 312.

Step 314: The power provided to the frequency synthesizer 1052 is increased or turned on again.

Step 316: The compensating unit 1110 updates the second timer using the first timer.

Step 318: The primary clock signal S_P is activated again. The clock signal for the controlling circuit is switched from the reference clock signal S_R to the primary clock signal S_P.

Step 320: The clock system 100 exits the power saving mode.

Step 322: End.

Figure 4:
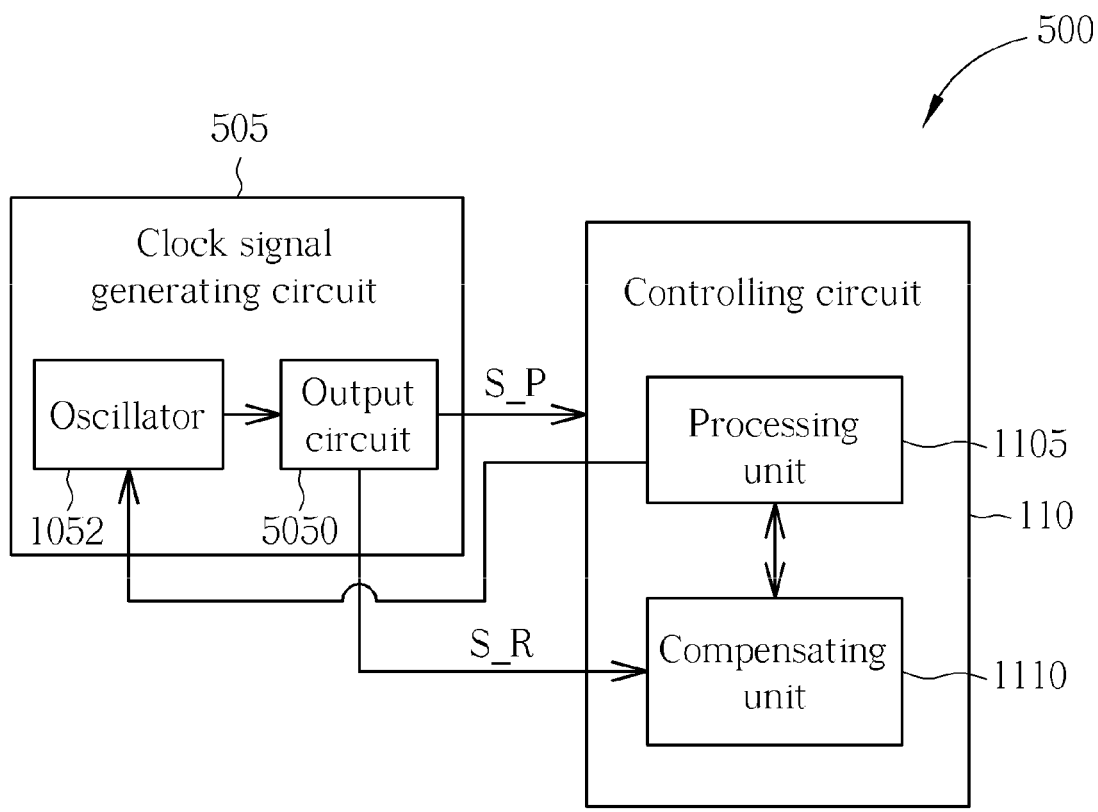
FIG. 4 is a block diagram of a clock system for timing information compensation of a clock signal according to another embodiment of the present invention.

In addition, in other embodiments, the frequency synthesizer may be an optional element. For example, if a portable communication device merely needs a few frequencies, the frequency synthesizer is not necessary. That is, an oscillating signal generated by an oscillator is directly used as the primary clock signal S_P inputted to the controlling circuit 110. FIG. 4 is a block diagram of a clock system 500 for timing information compensation of a clock signal according to another embodiment of the present invention. The clock system 500 comprises a clock signal generating circuit 505 and the controlling circuit 110. The clock signal generating circuit 505 comprises the oscillator 1052 and an output circuit 5050. The output circuit 5050 is coupled to the oscillating signal of the oscillator 1051 and used for receiving the oscillating signal, directly outputting the oscillating signal as the reference clock signal S_R, and selectively outputting the oscillating signal as the primary clock signal S_P, wherein when the clock system 500 is under the normal mode, the output circuit 5050 outputs the oscillating signal as the primary clock signal S_P, and when the clock system 500 is under the power saving mode, the output circuit 5050 does not output the oscillating signal as the primary clock signal S_P. The oscillator 1051 is also enabled no matter whether the clock system 500 is under the normal mode or the power saving mode.

Those skilled in the art will readily observe that numerous modifications and alterations of the device and method may be made while retaining the teachings of the invention.

What is claimed is:

1. A clock system, comprising:
   a clock signal generating circuit, for generating a primary clock signal and a reference clock signal both derived from an oscillating signal of the clock signal generating circuit; and
   a controlling circuit, coupled to the clock signal generating circuit, for receiving the primary clock signal under a normal mode, and for compensating a timing information generated from the primary clock signal according to the reference clock signal when the clock system exits a power saving mode;
   wherein the primary clock signal is de-activated when the clock system enters the power saving mode and is activated when the clock system exits the power saving mode.

2. The clock system of claim 1, wherein the controlling circuit comprises a first timer corresponding to the reference clock signal and a second timer corresponding to the primary clock signal; and when the clock system exits the power saving mode, the controlling circuit is arranged to compensate the timing information by updating the second timer according to the first timer.

3. The clock system of claim 1, wherein the controlling circuit comprises a first timer corresponding to the reference clock signal and a second timer corresponding to the primary clock signal, and the controlling circuit is arranged to synchronize a time boundary of the first timer with a time boundary of the second timer before entering the power saving mode and to update the time boundary of the second timer by referring to the time boundary of the synchronized first timer when exiting the power saving mode.

4. The clock system of claim 3, wherein the controlling circuit further refers to a synchronization delay time or an update delay time to compensate the timing information.

5. The clock system of claim 1, wherein the controlling circuit refers to a ratio of a frequency of the primary clock signal to a frequency of the reference clock signal, to compensate the timing information.

6. The clock system of claim 5, wherein the controlling circuit uses a counter to count a cycle number of the reference clock signal under the power saving mode; and the controlling circuit is arranged to calculate a target cycle number by referring to the cycle number counted by the counter, so as to use the target cycle number to update a cycle number of the primary clock signal.

7. The clock system of claim 1, wherein the clock signal generating circuit comprises:
- an oscillator, for generating the oscillating signal acting as the reference clock signal inputted to the controlling circuit; and
- a frequency synthesizer, coupled to the oscillator, for receiving the oscillating signal and generating the primary clock signal according to the oscillating signal when the clock system is under the normal mode, wherein power provided to the frequency synthesizer is decreased or disabled when the clock system is under the power saving mode.

8. The clock system of claim 7, wherein the oscillator is a temperature compensated oscillator which is enabled no matter whether the clock system is under the normal mode or the power saving mode.

9. The clock system of claim 1, wherein the clock signal generating circuit comprises:
- an oscillator, for generating the oscillating signal; and
- an output circuit, coupled to the oscillating signal, for receiving the oscillating signal, directly outputting the oscillating signal as the reference clock signal, and selectively outputting the oscillating signal as the primary clock signal, wherein when the clock system is under the normal mode, the output circuit outputs the oscillating signal as the primary clock signal, and when the clock system is under the power saving mode, the output circuit does not output the oscillating signal as the primary clock signal.

10. The clock system of claim 9, wherein the oscillator is enabled no matter whether the clock system is under the normal mode or the power saving mode.

11. A method used in a clock system, comprising:
- utilizing a clock signal generating circuit to generate a primary clock signal and a reference clock signal both derived from an oscillating signal of the clock signal generating circuit;
- receiving the primary clock signal under a normal mode; and
- compensating a timing information generated from the primary clock signal according to the reference clock signal when the clock system exits a power saving mode;
- wherein the primary clock signal is de-activated when the clock system enters the power saving mode and is activated when the clock system exits the power saving mode.

12. The method of claim 11, further comprising:
- providing a first timer corresponding to the reference clock signal and a second timer corresponding to the primary clock signal; and
- the step of compensating the timing information generated from the primary clock signal comprises:
- compensating the timing information by updating the second timer according to the first timer.

13. The method of claim 11, further comprising:
- providing a first timer corresponding to the reference clock signal and a second timer corresponding to the primary clock signal
- wherein the step of compensating the timing information generated from the primary clock signal comprises:
- synchronizing a time boundary of the first timer with a time boundary of the second timer before entering the power saving mode; and
- updating the time boundary of the second timer by referring to the time boundary of the synchronized first timer when exiting the power saving mode.

14. The method of claim 13, wherein the step of compensating the timing information generated from the primary clock signal comprises:
- compensating the timing information by referring to a synchronization delay time or an update delay time.

15. The method of claim 11, wherein the step of compensating the timing information generated from the primary clock signal comprises:
- compensating the timing information by referring to a ratio of a frequency of the primary clock signal to a frequency of the reference clock signal.

16. The method of claim 15, wherein the step of compensating the timing information by referring to the ratio comprises:
- using a counter used to count a cycle number of the reference clock signal under the power saving mode;
- calculating a target cycle number by referring to the cycle number counted by the counter and the ratio; and
- utilizing the target cycle number to update a cycle number of the primary clock signal.

17. The method of claim 11, wherein the step of utilizing the clock signal generating circuit to generate the primary clock signal and the reference clock signal comprises:
- directly generating the oscillating signal acting as the reference clock signal; and
- utilizing a frequency synthesizer for receiving the oscillating signal and generating the primary clock signal according to the oscillating signal when the clock system is under the normal mode, wherein power provided to the frequency synthesizer is decreased or disabled when the clock system is under the power saving mode.

18. The method of claim 17, wherein the reference clock signal is a temperature compensated signal which is activated no matter whether the clock system is under the normal mode or the power saving mode.

19. The method of claim 11, wherein the step of utilizing the clock signal generating circuit to generate the primary clock signal and the reference clock signal comprises:
- generating the oscillating signal; and
- providing an output circuit, utilizing the output circuit to receive the oscillating signal and to directly output the oscillating signal as the reference clock signal, and selectively outputting the oscillating signal as the primary clock signal;
- wherein when the clock system is under the normal mode, the oscillating signal is outputted as the primary clock signal, and when the clock system is under the power saving mode, the oscillating signal is not outputted as the primary clock signal.

20. The method of claim 19, wherein the reference clock signal is activated no matter whether the clock system is under the normal mode or the power saving mode.

21. A clock system, comprising:
- a clock signal generating circuit, for generating a primary clock signal and a reference clock signal;
- a first timer corresponding to the reference clock signal;
- a second timer corresponding to the primary clock signal; and
- a compensating unit, coupled to the first timer and the second timer, for aligning a time boundary of the first timer with a time boundary of the second timer when entering a power saving mode, and for aligning a time boundary of the second timer with a time boundary of the aligned first timer when exiting the power saving mode.

22. The clock system of claim 21, wherein the compensating unit is arranged to receive the primary clock signal under a normal mode, and to compensate a timing information generated from the primary clock signal according to the reference clock signal when the clock system exits the power saving mode; and the primary clock signal is de-activated when the clock system enters the power saving mode and is activated when the clock system exits the power saving mode.

* * * * *